Figure 1:
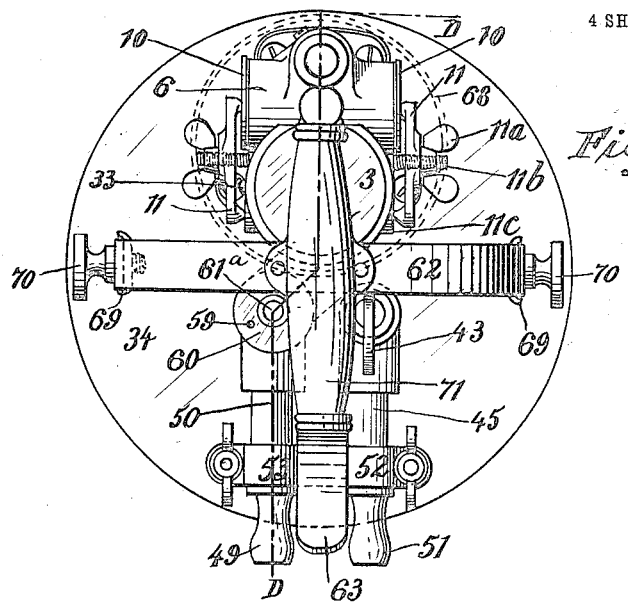

W. H. LAWRENCE.
APPARATUS FOR PULSATING OR VARYING AIR OR FLUID PRESSURE.
APPLICATION FILED JAN. 30, 1913.

1,125,348.

Patented Jan. 19, 1915.

4 SHEETS—SHEET 1.

Witnesses:
Inventor:
William Henry Lawrence
By McChesney Parker & Heard, attys

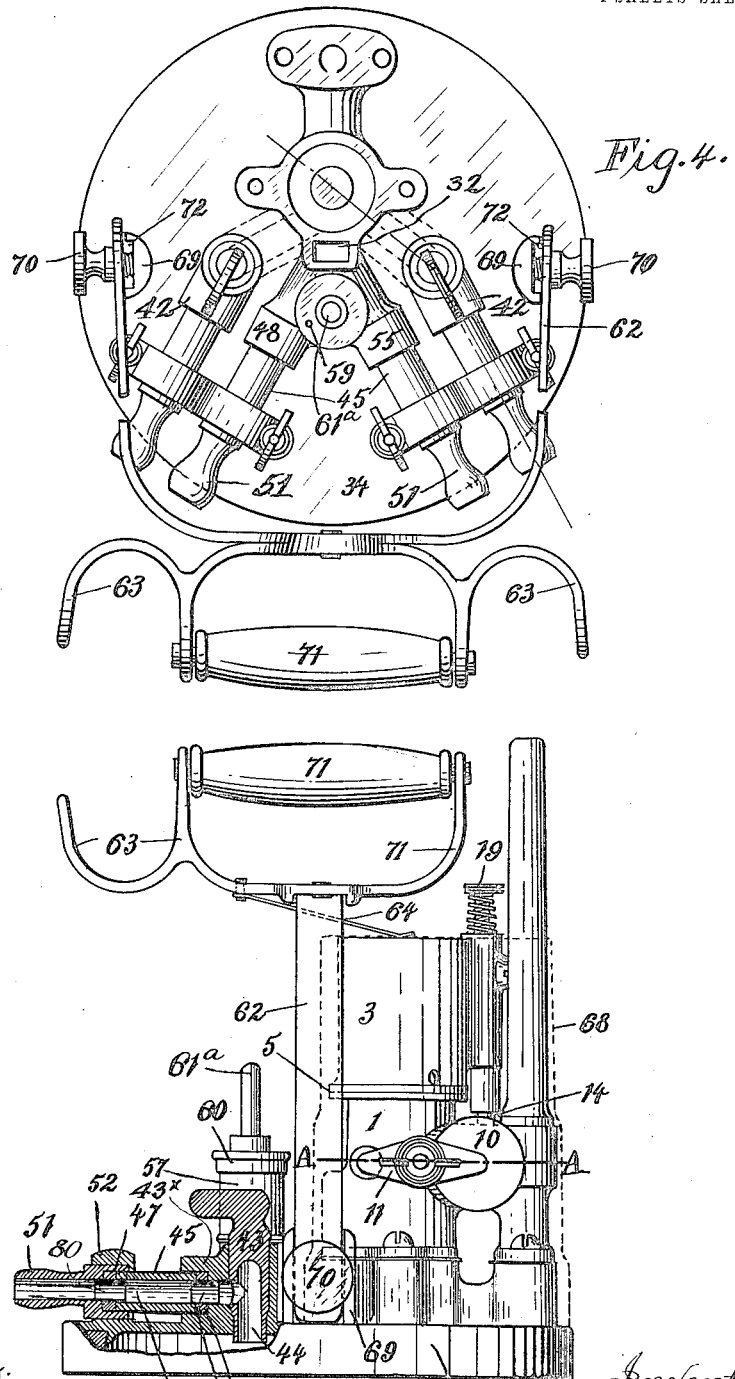

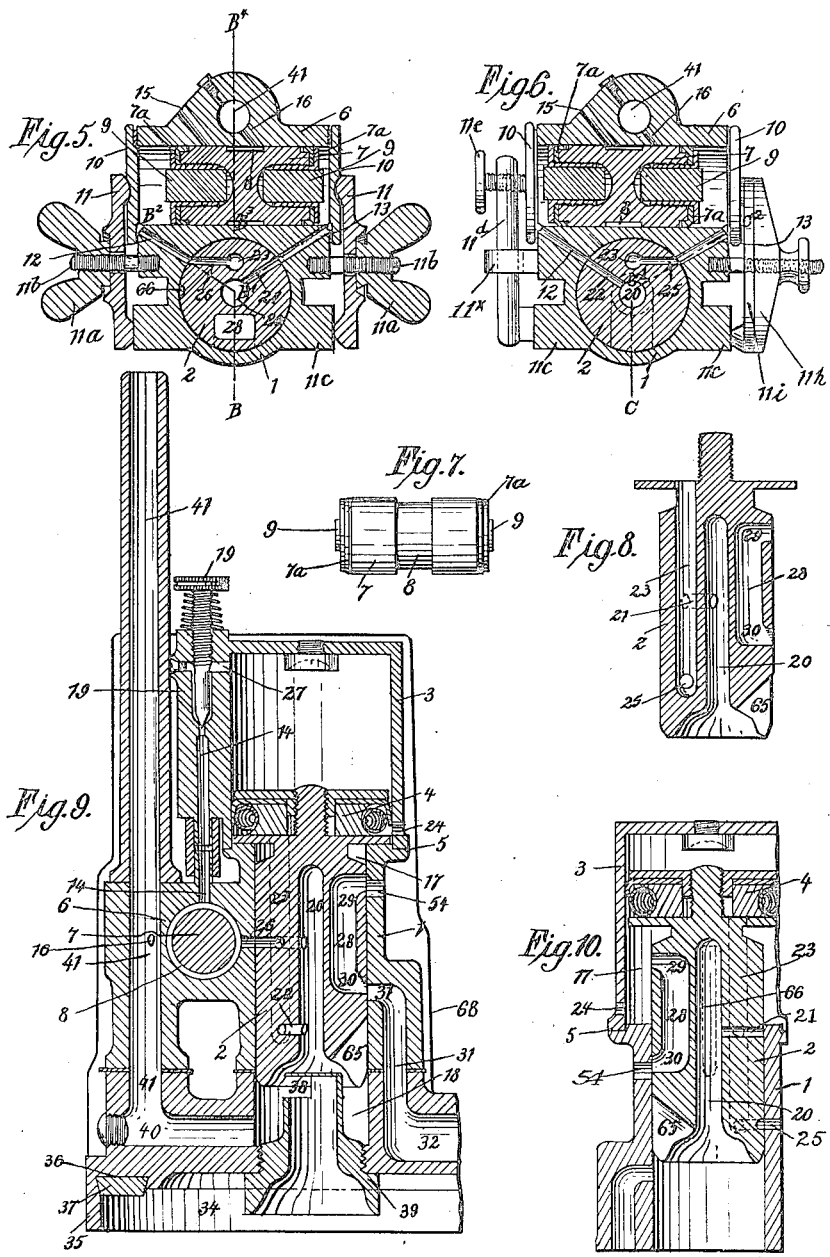

W. H. LAWRENCE.
APPARATUS FOR PULSATING OR VARYING AIR OR FLUID PRESSURE.
APPLICATION FILED JAN. 30, 1913.
1,125,348.
Patented Jan. 19, 1915.
4 SHEETS—SHEET 4.
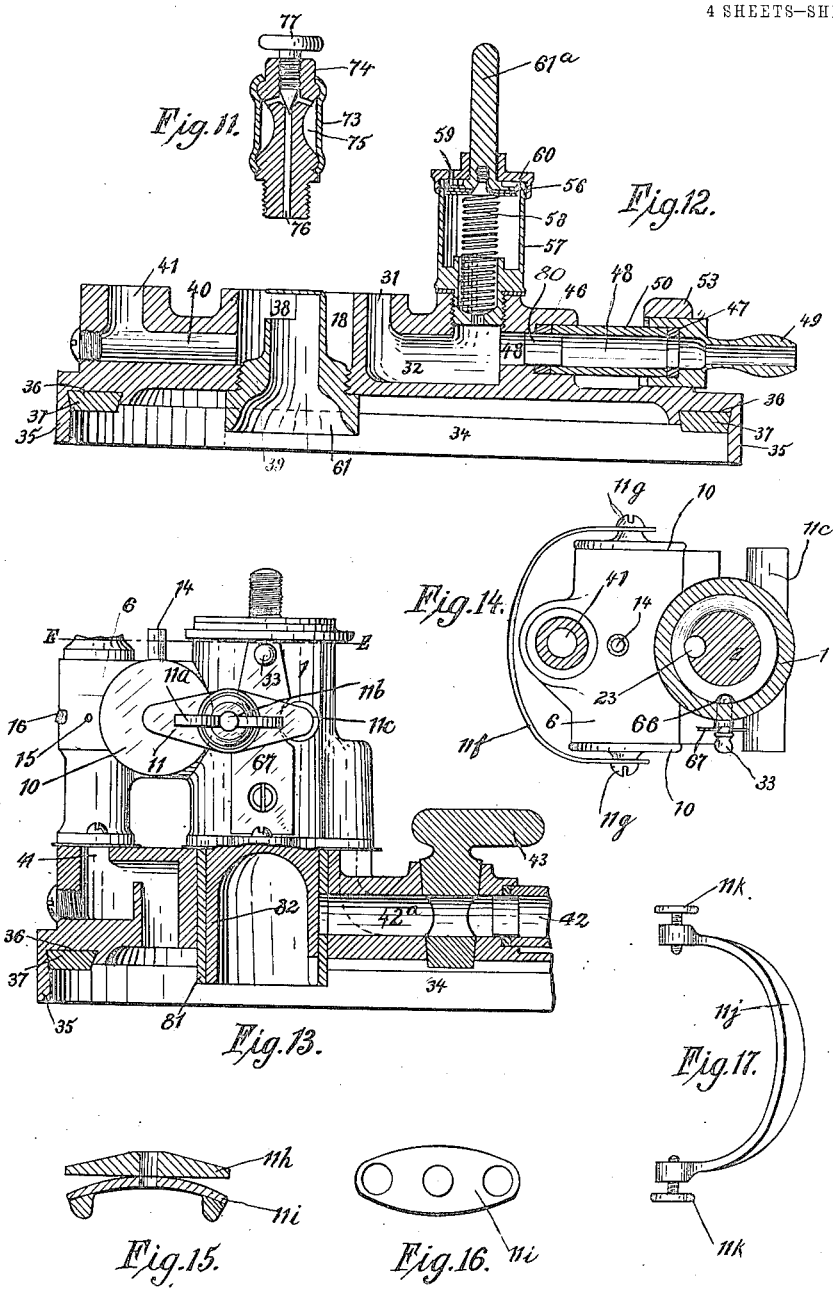

UNITED STATES PATENT OFFICE.

WILLIAM HENRY LAWRENCE, OF MELBOURNE, VICTORIA, AUSTRALIA, ASSIGNOR TO D. H. BURRELL & COMPANY, OF LITTLE FALLS, NEW YORK.

APPARATUS FOR PULSATING OR VARYING AIR OR FLUID PRESSURE.

1,125,348.　　　　Specification of Letters Patent.　　Patented Jan. 19, 1915.

Application filed January 30, 1913. Serial No. 745,249.

*To all whom it may concern:*

Be it known that I, WILLIAM HENRY LAWRENCE, of No. 35 Melville street, Pollokshields, Glasgow, Scotland, at present temporarily residing at Menzies Hotel, Melbourne, in the British State of Victoria, Commonwealth of Australia, engineer, a subject of the King of Great Britain and Ireland, have invented new and useful Improvements in Apparatus for Pulsating or Varying Air or Fluid Pressure, of which the following is a specification.

This invention relates to apparatus for producing pulsations or variations in fluid pressure, and more particularly to apparatus of this kind employed in connection with pneumatic milking machines for intermittently applying suction to the teat cups or analogous parts of the machine.

The objects of the invention are to produce an efficient and reliable apparatus of improved construction in which all of the parts are easily accessible for cleaning or repairs; also to so construct the base of the apparatus as to form a cover for the milk pail or receptacle which will prevent any liquids or substances other than milk from entering into the milk receptacle; also to provide the apparatus with a device of improved construction for indicating the pulsations or variations in fluid pressure produced by the mechanism; also to provide means for facilitating the handling or carrying of the apparatus and for protecting the same against injury; also to improve the construction of apparatus of this kind in the respects hereinafter specified.

This invention is shown in the drawings as applied to a pneumatic milking machine, but it will be understood that the invention is not limited to this use but can be employed for other purposes, and can if desired be operated in connection with media other than air.

Figure 2:
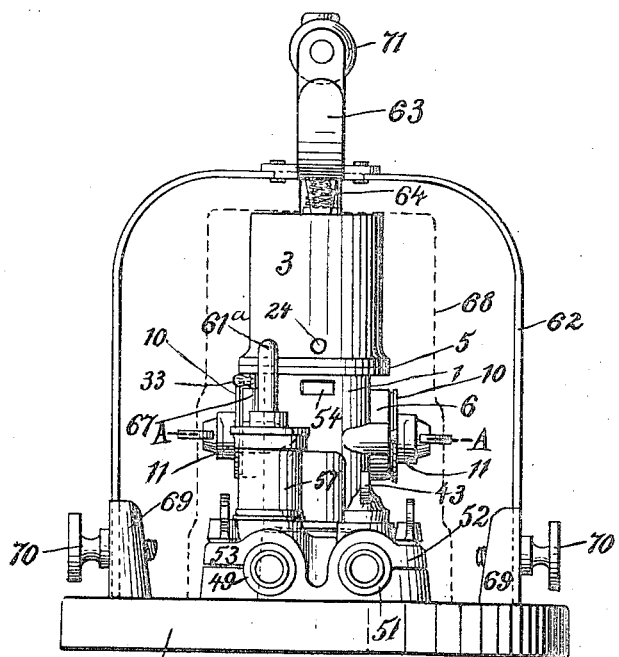

In the accompanying drawings: Figure 1 is a top plan view of an apparatus embodying the invention, suitable for use with one set of teat cups. Fig. 2 is a front elevation thereof. Fig. 3 is a side elevation thereof, partly in section. Fig. 4 is a top plan view of an apparatus adapted for use with two sets of teat cups and having the pulsating mechanism detached therefrom. Figs. 5 and 6 are fragmentary horizontal sections on lines A—A, Figs. 2 and 3, showing the parts of the mechanism in different positions. Fig. 7 is a top plan view of the reversing valve detached from the apparatus. Fig. 8 is a central sectional elevation of the pulsator valve detached from the apparatus. Fig. 9 is a fragmentary sectional elevation of the apparatus on line B B' B² B³ B⁴, Fig. 5. Fig. 10 is a fragmentary sectional elevation thereof on line C C' C², Fig. 5. Fig. 11 is a central sectional elevation of a device for indicating the pulsations or variations in the fluid pressure. Fig. 12 is a fragmentary sectional elevation on line D—D, Fig. 1, showing the base of the apparatus and snowing a pulsation indicator of different construction. Fig. 13 is a fragmentary elevation, partly in section, of an apparatus of modified construction. Fig. 14 is a sectional plan view thereof, on line E—E, Fig. 13, showing holding means of modified construction for the valve chest covers. Figs. 15 and 16 are respectively a longitudinal section and an elevation of holding means of another construction for the valve chest covers. Fig. 17 shows holding means of still another construction.

1 represents a pulsator valve cylinder within which a pulsator valve 2 is adapted to reciprocate, and 3 represents a motor cylinder of greater area which forms a continuation of the valve cylinder 1 and in which a motor piston 4 is slidably arranged. The motor cylinder is preferably made easily detachable from the valve cylinder at their juncture 5 to facilitate the cleaning of the apparatus. The pulsator valve is preferably made in the form of a cylindrical plunger and is secured to the motor piston 4 in any suitable manner so as to permit these parts to be readily detached from each other. In the construction shown in the drawings, the lower face of the piston 4 and the upper face of the pulsator valve 2 are subjected to atmospheric pressure which enters the cylinder 3 through an opening 24. During the operation of the apparatus the lower face of the pulsator valve 2 is subjected to the suction which operates the apparatus while the upper face of the motor piston 4 may be subjected to either the same suction or to air at atmospheric or higher pressures. The upward movement of the pulsator valve and motor piston takes place when the upper face of the piston, which is of greater area than the pulsator valve, will cause the piston and valve to move upwardly. When air at atmospheric pressure is admitted to the motor cylinder above the piston, the suction acting on the lower face of the pulsator valve will cause the piston and valve to move to their lower positions.

The upper portion of the motor cylinder 3 is connected either with the suction which operates the milking devices or with the atmosphere by means of a reversing valve 7 which, in the construction shown, is cylindrical in form and operates in a cylinder 6, preferably formed integral with the pulsator cylinder 1. The reversing valve is preferably provided with flexible cup-shaped packing rings 7ª or other means for preventing leakage between the valve and cylinder and has a peripheral recess 8 which is adapted to form a connection between a passage 14 which connects with a passage 27 leading to the upper end of the motor cylinder 3 and either one of two ports 15 and 16. The port 15 connects the valve cylinder 6 with the atmosphere and the port 16 leads into a suction tube 41 which is connected with a suction space 18 in the base 34 of the apparatus. When the reversing valve is at one end of its movement as shown in Fig. 5, the peripheral recess 8 connects the passage 14 with the port 16, causing the suction from the tube 41 to be communicated to the cylinder 3. When the reversing valve is in its other position, as shown in Fig. 6, the passage 14 is uncovered by the reversing valve and connected with the port 15, thus subjecting the cylinder to atmospheric pressure. The flow of air through the tube 14 to and from the motor cylinder may be regulated by a valve 19 of any suitable kind. Thus the time required to exhaust the motor cylinder or to break the suction therein may be varied so that the pulsations of the apparatus can be regulated.

The valve 7 may be moved back and forth in the cylinder 6 in any suitable manner, the following construction being, however, preferably employed for this purpose: The opposite ends of the cylinder 6 are connected by means of passages 12 and 13 with the interior of the pulsator cylinder 1 and the pulsator valve 2 has ports 21 and 22, Figs. 5, 6 and 10, which connect with a passage 20 extending into the pulsator valve and opening at its lower end into the suction space 18 in the base of the apparatus. The ports 21 and 22 are so arranged relatively to the passages 12 and 13 that when the pulsator valve is in its lower position as shown in Fig. 5, the passage 13 and port 21 will register, so that suction is admitted from the suction space 18 through the pulsator valve to one side of the cylinder 6, thereby drawing the reversing valve 7 to that side of the cylinder. When the pulsator valve is in its upper position, shown in Fig. 6, the passage 12 and port 22 are in register, so that suction is produced on the opposite side of the cylinder 6, thus drawing the valve 7 to its other position. When one side of the reversing valve cylinder is subjected to suction, the suction in the other side thereof is relieved. This is accomplished, in the construction shown, by means of two relief ports 25 and 26 in the pulsator valve 2 which communicate with the atmosphere through a passage 23 extending lengthwise of the valve and terminating in the upper end thereof. The passage 23 communicates with the atmosphere through the opening 24 in the cylinder 3. The relief ports 25 and 26 are so arranged on the pulsator valve that the port 26 engages with the passage 12 when the suction port 21 engages with the passage 13, and so that the relief port 25 engages with the passage 13 when the suction port 22 engages with the passage 12, thus relieving the suction on one side of the cylinder 6 at the same time that the other side thereof is subjected to the suction.

In order to reduce the friction between the reversing valve and the cylinder, the valve is made as light as possible and is preferably made hollow at its opposite ends, the hollow ends being filled with buffers 9 which are preferably light in weight and elastic to absorb any shocks by the striking of the valve against the ends of the cylinder. The valve may, however, be of any other suitable construction adapting it to be reciprocated in its cylinder by air pressure.

It is desirable to so construct the reversing valve cylinder 6 as to render the valve 7 readily accessible for cleaning or repairs. For this reason the cylinder is provided at its opposite ends with cylinder heads 10 which are secured thereto in any suitable manner so as to be readily removable therefrom. In the construction shown in Figs. 1 and 5, each of the cylinder heads is held in its operative position by means of a yoke 11 which bears at one end upon the cylinder head and at its other end on a projection 11ᶜ extending outwardly from the pulsator cylinder 1. The yokes are preferably made of resilient material and are secured in their operative positions by means of thumb screws 11ª engaging with studs 11ᵇ which project through central holes in the yokes 11 and are secured to the pulsator cylinder. In the construction shown in Figs. 6, 15 and 16, the resilient yoke is replaced by a two-piece yoke consisting of a resilient part 11ⁱ and a rigid part 11ʰ. Another clamping device of slightly modified construction is shown on the left-hand side of Fig. 6, in which a clamping yoke or lever 11ᴬ is employed which extends through an eye 11ᵇ formed on the cylinder 1 and which bears at one end upon the projection 11ᶜ and is provided at its other end with a clamping screw 11ᵈ which bears on the cylinder head. In the construction shown in Fig. 14, the two cylinder heads are connected by means of a spring clamp 11ᶠ which is secured to the heads by means of screws 11ᵍ, and which presses the two cylinder heads into engagement with the ends of the cylinder. If desired, this construction may be modified as shown in Fig. 17, in which a rigid clamp 11ʲ is employed which is provided at its opposite ends with set screws 11ᵏ adapted to engage with the cylinder heads to hold the same in engagement with the ends of the cylinder.

In the operation of the apparatus the motor piston 4 and the pulsator valve 2 are moved upwardly when the upper end of the motor cylinder 3 is subjected to suction. In the upper position of the pulsator valve, Fig. 10, connections are established, as shown in Fig. 6, to cause the reversing valve 7 to be moved to the opposite end of its stroke and thereby break the suction in the upper end of the motor cylinder and admit atmospheric pressure thereto. This causes the motor piston 4 and pulsator valve 2 to move downwardly. In the lower position of the pulsator valve, Fig. 9, connections are established as shown in Fig. 5, to cause the reversing valve 7 to be moved to its former position, thereby again connecting the upper portion of the motor cylinder with the suction and causing the motor piston and pulsator valve to move to their upper positions, whereupon the operation is repeated as above described. This reciprocatory movement of the pulsator valve is employed to produce the pulsations or variations in pressure in the milking devices by alternately connecting the same with the suction and with the atmosphere. For this purpose a passage 28 is provided in the pulsator valve which terminates in ports 29 and 30 leading to the outer surface of the valve, and a passage 31 is formed in the wall of the pulsator cylinder which connects with a pulsation passage 32 formed in the base of the apparatus and connecting with a tube 48 which leads to the teat cups or milking devices. When the pulsator valve 2 is in its lower position, Fig. 9, the port 30 connects with the passage 31 and the port 29 registers with an opening 54 in the wall of the cylinder 1 and thus admits atmospheric pressure to the pulsation passage 32 through the passage 28 in the pulsator valve. As the pulsator valve moves upwardly the passage 31 in the cylinder 1 is uncovered by the valve so that the suction space 18 in the base of the apparatus is in communication with the passages 31, 32 and 48. In order that the suction passage may be in communication with the suction space during the greater part of the reciprocatory movement of the pulsator valve, the valve is provided with a recess 65 which establishes communication between the suction space 18 and the passage 31 shortly after the controlling valve moves out of its lower position.

Any suitable means may be employed for preventing the pulsator valve from turning on its vertical axis in the cylinder 1. The means shown for this purpose comprise a longitudinal groove 66 in the periphery of the valve, Figs. 5 and 14, and a key or stud 33 projecting through a hole in the cylinder 1 and slidably engaging in the groove. This stud is preferably held in its engaging position by a spring 67 which enables the stud to be easily withdrawn out of the groove to permit the withdrawal of the controlling valve from the cylinder.

The base on which the apparatus is mounted may be of any suitable construction, enabling it to be employed as a cover for a milk receptacle. In the construction shown, the base 34 has a downwardly extending annular flange 35 which is adapted to overhang the upper edge of the milk receptacle and is provided, near its outer edge, with an annular dovetail groove 36 which contains a packing ring or gasket 37 preferably of rubber or other yielding material and which is adapted to rest on the upper edge of the milk receptacle to form an air tight seal between the base of the apparatus and the receptacle. By making the groove dovetailed, the washer 37 will be securely held in place therein.

The suction space 18 in the base of the apparatus communicates with the interior of the milk receptacle by means of a nozzle 39 which is removably secured in the base. The upper portion of this nozzle extends into the suction space 18 and is provided at one side with an opening 38. The lower end of the nozzle is preferably made bell-shaped, as shown at 61, and is of comparatively large diameter to prevent the drawing into the suction chamber of the finely divided particles of milk which collect on the base 34 and thus effects not only a saving in milk but also prevents a filling up of the suction space 18 with milk, which would interfere with the operation of the apparatus. The nozzle 39 through which the suction is communicated from the suction space in the base to the milk receptacle, also forms a trap which prevents liquid or other matter which may collect in the suction space from passing into the milk receptacle. The suction passage 18 in the base of the apparatus is connected by means of a passage 40 with the suction tube 41, which may be connected with any suitable pump or device for exhausting air from the suction space and the milk receptacle.

The suction from the milk receptacle is communicated to the teat cups or milking devices through a suction passage 42, Fig. 3, which is controlled by means of a stop cock 43 engaging in a lug 43× formed on the base and having a passage 44 extending through the base 34 of the apparatus. The suction passage 42 preferably includes a transparent tube 45 through which the flow of milk can be observed and which terminates in a nipple 51, which is secured on the base by a clamp 52 and to which the flexible tubes connecting with the teat cups or milking devices are attached. The transparent tube 45 may be held in position on the base in any suitable manner. In the construction shown, the ends of the tube are secured in sockets formed in the lug 43× and in the inner end of the nipple 51. The ends of the transparent tube engage with washers 46 and 47 to form an air-tight connection between the transparent tube and the nipple 51 and lug 43×. In order to prevent the washers 46 and 47, which are made of flexible material, from being drawn into the suction passage 42, ferrules 80, provided at opposite ends of the transparent tube, are preferably placed into the passage inside of the washers to prevent the collapsing of the washers owing to the suction within the passage. A similar transparent tube 50 and nipple 49 are also placed in the pulsation passage 48, as shown in Fig. 12, the nipple being held by a clamp 53.

A suitable indicator is preferably provided which enables the operator to determine whether the apparatus is operating properly and for indicating the speed at which the device is operating, and approximately the degree of variations in pressure produced by the apparatus. Any suitable means may be employed for this purpose. In the construction shown in Fig. 12, a cylinder 57 is provided which communicates at its lower end with the pulsation passage 32 and in which a piston 56 is slidably arranged. The action of the suction tending to draw the piston 56 into its lower position is opposed by a spring 58 which presses against the lower face of the piston. A vent hole 59 is provided in the upper end of the cylinder 57. The cylinder 57 may be made of transparent material so that the movement of the piston therein can be readily seen, or the piston may be provided with an extension or rod 61ª projecting through an opening in a cylinder head 60. The position of the piston and of the rod 61ª indicates the degree of suction within the pulsation passage 32. Another form of indicator is shown in Fig. 11 which consists of a screw stud 74 having a central passage 76 connecting with the pulsation passage 32 and terminating in an annular groove or recess 75 formed in the outer periphery of the stud. An elastic tube or membrane 73 is stretched around the recess 75 in the upper part of the stud. The variations in pressure in the passage 32 will be communicated through the passage 76 in the stud to the recess therein and thus cause the elastic membrane to contract and dilate in accordance with the variations in suction in the pulsation passage. The flow of air to the recess 75 in the stud can be controlled by means of a needle valve 77 arranged in the upper end of the stud. A gage or other form of indicator may be used if desired in place of those described.

The apparatus is preferably provided with a handle to facilitate the carrying of the same. In the construction shown, the apparatus is provided with a bail 62 which is pivoted by means of thumb screws 70 on brackets 69 secured to the base 34. These brackets are provided with vertical recesses 72, Fig. 4, into which the pivoted ends of the bail can enter and in which they can be secured by tightening the thumb screws 70 when the bail is in its upright position. The bail is provided with a handle 71, and hooks 63 may, if desired, be secured at opposite ends of the handle on which the teat cups can be suspended when not in use.

The apparatus may be provided with a cover 68, shown in dotted lines in Figs. 1–3 and 9, which may be of any suitable construction and which preferably covers only the pulsator mechanism and leaves the pulsation indicator, the suction and pulsation passages and the regulating valve 19 exposed so that they are readily accessible. A spring 64, Figs. 2 and 3, attached to the handle of the apparatus holds the cover and the movable parts of the pulsator mechanism in place.

In the construction shown in Fig. 4, the apparatus is adapted to operate on two sets of teat cups. For this purpose a second tube 55, similar to the tube 48, joins into the pulsation passage 32. Two suction passages are shown in this figure and are located at opposite sides of the pulsation passages. The suction passages communicate with the interior of the milk receptacle in the same manner as hereinbefore described.

Fig. 13 discloses a construction which can be employed when the apparatus is used in connection with single chambered teat cups. In this construction the suction passage 42 instead of being led directly into the milk receptacle, terminates in a cylinder 81, as shown at 42ª, and is alternately opened and closed by a pulsator valve 82 corresponding substantially with the pulsator valve 2 hereinbefore described.

The apparatus has been described as operated by the suction which is employed for milking and by atmospheric pressure. Pressure greater than atmospheric can, however, be employed if desired.

I claim as my invention:

1. In a pulsator, the combination of a pulsator cylinder, a pulsator valve in said cylinder, means for reciprocating said valve in said cylinder, a longitudinal groove in the periphery of the valve, a pin extending through the wall of the cylinder and projecting into the groove, and means for yieldingly holding said pin in said groove and permitting the pin to be withdrawn to enable the valve to be removed from said cylinder.

2. In a pulsator, the combination of a motor cylinder and a piston, a reversing valve adapted to supply motive fluid to the motor cylinder, a cylinder in which said reversing valve is contained, removable cylinder heads at opposite sides of said valve cylinder, and means for clamping said cylinder heads into their operative positions.

3. In a pulsator, the combination of a motor cylinder and a piston, a reversing valve adapted to supply motive fluid to the motor cylinder, a cylinder in which said reversing valve is contained, removable cylinder heads at opposite sides of said valve cylinder, and resilient clamping means for yieldingly securing said cylinder heads in their operative positions.

4. A milking machine having a base which is adapted to form a cover for a milk receptacle, and a bell-shaped suction nozzle which projects through said base and through which the air is exhausted from said milk receptacle.

5. In a milking machine, the combination with pulsating mechanism, of a base on which said mechanism is mounted and which is adapted to form a cover for a milk receptacle, a suction space in said base, and a suction nozzle extending through said base to connect the milk receptacle with the suction space, said nozzle extending into the upper part of said suction space to form a trap to prevent liquid from said suction space from entering the milk receptacle.

6. In a milking machine, the combination with pulsating mechanism, of a base on which said mechanism is mounted and which is adapted to form a cover for a milk receptacle, a suction space in said base, and a bell-shaped suction nozzle extending through said base to connect the milk receptacle with the suction space and terminating at its upper end above the floor of said suction space to form a trap to prevent liquid from said suction space from entering the milk receptacle.

7. In a milking machine, the combination with pulsating mechanism, of a base on which said mechanism is mounted and which is adapted to form a cover for a milk receptacle and which is provided with a passage through which the pulsations are transmitted to the milking organs, and a pulsation indicator mounted on said base and communicating with said passage and having a movable part which moves in accordance with the variations of pressure in said passage.

8. In a milking machine, the combination with mechanism for producing variations in air pressure, of a device for indicating said variations comprising a cylinder having a transparent wall and to which the air at varying pressure is admitted, a piston in said cylinder, and a spring acting upon the piston and opposing the variable air pressure, whereby the position of the piston will indicate the pressure of the air.

9. In a milking machine, the combination with pulsating mechanism, of a base on which said mechanism is mounted and which is adapted to form a cover for a milk receptacle and which is provided with a passage through which the pulsations are transmitted to the milking organs, and a device mounted on the base for indicating variations in pressure in said passage comprising a cylinder which receives at one end the variable air pressure, a piston in said cylinder which is moved by the variations in air pressure, a spring opposing said movement of the piston, and a part secured to said piston and projecting out of the cylinder for indicating the position of the piston in said cylinder.

10. A milking machine having a suction conducting passage comprising several rigid tubes, a flexible washer interposed between their abutting ends to form an air-tight connection between said tubes, and a ferrule located within the tubes at their juncture and preventing the sucking of the washer into the tubes.

11. In a milking machine, the combination with pulsating mechanism, of a base on which said mechanism is mounted, a handle mounted on said base, and a spring on the handle adapted to hold parts of said pulsating mechanism in place.

12. In a milking machine, the combination with a pulsating mechanism, a passage connecting the pulsating mechanism with the milking organs, and means connected with said passage and having a part which moves in accordance with variations in pressure in said passage to indicate the extent to which the pressure in said passage varies.

13. In a milking machine, the combination with pulsating mechanism, of a base on which said mechanism is mounted, a cover adapted to rest on said base and to inclose said mechanism, a handle mounted on said base, and a spring on said handle adapted to yieldingly hold said cover in place.

In testimony whereof I have signed my name to this specification in the presence of two subscribing witnesses.

WILLIAM HENRY LAWRENCE.

Witnesses:
BEDLINGTON BODYCOMB,
W. J. S. THOMPSON.